(12) United States Patent
Blumenau

(10) Patent No.: US 6,263,445 B1
(45) Date of Patent: Jul. 17, 2001

(54) METHOD AND APPARATUS FOR AUTHENTICATING CONNECTIONS TO A STORAGE SYSTEM COUPLED TO A NETWORK

(75) Inventor: Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/108,075

(22) Filed: Jun. 30, 1998

(51) Int. Cl.[7] ................................................. G06F 11/00
(52) U.S. Cl. ................................................. 713/201; 380/3
(58) Field of Search ................................... 713/201, 200, 713/202; 380/3, 30, 42, 25; 714/4, 25, 47, 54

(56) References Cited

U.S. PATENT DOCUMENTS

| 4,652,990 | * | 3/1987 | Pailen et al. ............................ 364/200 |
| 5,235,642 | * | 8/1993 | Wobber et al. ........................ 380/25 |
| 5,276,735 | * | 1/1994 | Boebert et al. ........................ 380/21 |
| 5,771,291 | * | 6/1998 | Newton et al. ........................ 380/25 |
| 5,784,464 | * | 7/1998 | Akiyama et al. ..................... 380/25 |
| 5,864,843 | * | 1/1999 | Carino et al. ......................... 707/4 |
| 5,930,786 | * | 7/1999 | Carino et al. ......................... 707/4 |
| 5,941,947 | * | 8/1999 | Brown et al. ......................... 709/225 |
| 5,991,876 | * | 11/1999 | Johnson et al. ....................... 713/200 |
| 6,026,293 | * | 2/2000 | Osborn .................................. 455/411 |
| 6,044,155 | * | 3/2000 | Thomlinson et al. ................. 380/49 |
| 6,061,794 | * | 5/2000 | Angelo et al. ........................ 713/200 |
| 6,075,860 | * | 6/2000 | Ketcham .............................. 380/25 |

FOREIGN PATENT DOCUMENTS

| 0 580 350 A1 | 1/1994 | (EP) . |
| WO 95/13583 | 5/1995 | (WO) . |

OTHER PUBLICATIONS

PCT International Search Report, dated Oct. 28, 1999.

* cited by examiner

Primary Examiner—Nadeem Iqbal
(74) Attorney, Agent, or Firm—Wolf, Greenfield & Sacks, P.C.

(57) ABSTRACT

A data management technique for managing accesses to data at a shared storage system includes a filter at the storage system. The filter is coupled to a configuration table, which identifies which of a number of coupled host processors have accesses to each of the resources at the device. During operation, requests received from the host devices are filtered by the filter, and only those requests to resources that the individual host devices have privilege to access are serviced. Advantageously, data security is further enhanced by authenticating each of the requests received by the storage system to verify that the host processor that is represented as forwarding the request is the indicated host processor. In addition, transfers of data between the storage system and the host processor may be validated to ensure that data was not corrupted during the data transfer.

60 Claims, 14 Drawing Sheets

METHOD AND APPARATUS FOR AUTHENTICATING CONNECTIONS TO A STORAGE SYSTEM COUPLED TO A NETWORK

FIELD OF THE INVENTION

This invention relates generally to the field of information storage devices and more particularly to a method and apparatus for managing access to data in a storage device.

DESCRIPTION OF THE RELATED ART

Computer systems generally include one or more host processors and a storage system for storing data accessed by the host processor. The storage system may include one or more storage devices (e.g., disk drives) to service the storage needs of the host processor. Disk drives may include one or more disks of a recording media, such as a magnetic recording medium or an optical recording medium.

In a typical computer system configuration, a bus provides an interconnect between the host processor and the storage system. The bus operates according to a protocol, such as the Small Component System Interconnect (SCSI) protocol, which dictates a format of packets transferred between the host processor and the storage system. As data is needed by the host processor, requests and responses are forwarded to and from the storage system over the bus.

With the growth of networked computer systems, multiple hosts have been coupled over a network to a shared data storage system. Fibre Channel is an example of a network that can be used to form such a configuration. Fibre Channel is a network standard that allows multiple initiators to communicate with multiple targets over the network, where the initiator and target may be any device coupled to the network. Using a network, multiple hosts are able to share access to a single storage system. One problem with coupling multiple hosts to a shared storage system is the management of data access at the storage system. Because multiple hosts have access to a common storage system, each host may physically be able to access information that may be proprietary to the other host processors.

Various techniques have been implemented to manage access to data at the storage system. For example, certain portions or zones of memory at the storage system may be dedicated to one or more of the hosts. Each host is 'trusted' to access only those portions of memory for which it has privileges. However, such an approach is vulnerable to the individual actions of each of the hosts. As a result, such a data management method may not be sufficient to protect data from unprivileged accesses.

SUMMARY OF THE INVENTION

According to one aspect of the invention, a data management method for managing access to a storage system by a device includes steps of authenticating, at the storage system, that each request in a series of requests for access to the storage system indicated as having been issued by the device was actually issued by the device and responsive to the step of authenticating, selectively servicing each request that is authenticated.

According to another aspect of the invention, a method for managing access by a device to a storage system, includes the steps of receiving, at the device, at least one expected identifier to be included in at least one subsequent request issued by the device to the storage system and issuing, from the device, at least one request to the storage system, the at least one request including the at least one expected identifier.

According to another aspect of the invention, a host computer for use in a system including a storage device includes a port to receive at least one expected identifier to be included in at least one subsequent request for access to the storage system and a controller to issue at least one request to the storage system, the at least one request including the at least one expected identifier.

According to another aspect of the invention, a storage system includes at least one storage device apportioned into a plurality of volumes and an adapter to interface the storage system to a plurality of devices, the adapter to authenticate at least one request from at least one of devices of the plurality of devices to verify that the at least one request was issued from the at least one of the devices, the adapter to selectively forward the at least one request to the at least one storage device for servicing responsive to authentication of the at least one request.

According to another aspect of the invention, an adapter is provided for use in a device to authenticate a connection between the device and a storage system. The adapter includes a data structure comprising at least one entry to store at least one unique identifier provided by the storage system and a controller to issue at least one request to the storage system that includes the at least one unique identifier so that the storage system can use the at least one unique identifier to authenticate the connection between the device and the storage system.

DESCRIPTION OF DETAILED EMBODIMENTS

Figure 1A:
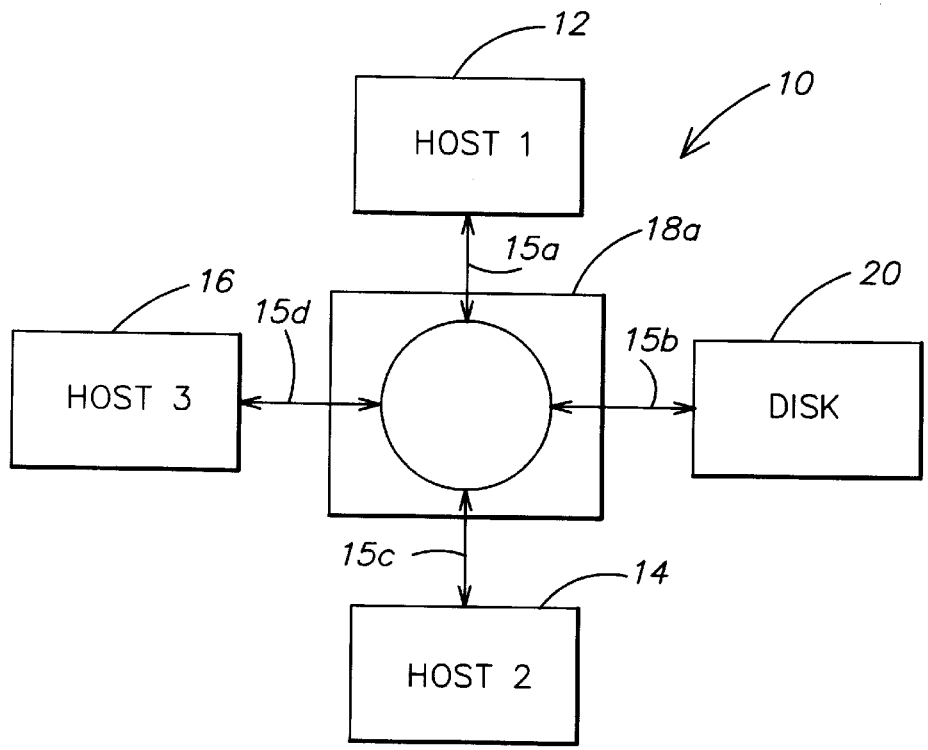
FIGS. 1A, 1B and 1C illustrate exemplary network configurations in which the data management aspect of the present invention can be employed.

The present invention is directed to a data management method and apparatus for managing accesses by multiple devices (e.g., host processors, file servers and the like) to data at a shared resource (e.g., a shared storage system). According to one embodiment, the shared resource selectively services requests from the devices for portions of data at the shared resource in response to configuration data associated with each of the portions of data at the resource.

In one embodiment, data at the shared resource is apportioned into volumes. Configuration data identifies which volumes of data are available for access by each of the devices coupled to the resource (e.g., over a network). The shared resource includes a filter that selectively forwards a request for servicing depending upon the identity of the device issuing the request and the configuration data associated with the volume to which access is sought. The filter forwards only those requests for volumes that the device has privileges to access. Requests to volumes for which the device does not have privileges are not serviced.

Filtering requests at the resource allows the control of the data management to be centralized in one location, rather than distributed throughout the network. Centralizing the data management control at the storage system removes the need to trust the hosts seeking access to the storage system to only access certain portions of data.

In one embodiment of the invention, in addition to filtering requests to support data management at the resource, security protection may be added to further secure the data at the resource. Because filtering is performed in response to the identity of the device initiating the request, data security may be compromised if a device falsely represents its identity to gain access to the resource. In addition, data transfers between the device and the resource may be corrupted by other devices coupled (e.g., over a network) to the resource. In one embodiment, an authentication method and apparatus is provided to verify that the device that is represented as the device issuing the request is truly the device that issued the request. The authentication method may therefore be implemented to overcome security problems associated with a device mis-representing its identity to obtain data at the resource. In another embodiment, a validation method and apparatus is provided to ensure that information, transferred between the device and the shared resource is not corrupted (either inadvertently or intentionally) during transit.

A data management system for managing data at a resource may use any or all of these filtering, authentication and validation techniques. One exemplary system wherein the data management method and apparatus of the present invention may be employed is in a networked computer system, wherein the devices are host processors or file servers coupled to the network, and the shared resource is a storage system (e.g., a disk device storage system). It should be appreciated that the use of a network, host processor or shared disk device is not a limitation of the present invention, and that such a system configuration is described below solely for purposes of illustration.

In one embodiment, one or more hosts may be coupled to one or more storage systems using a network, with requests and responses being forwarded to and from the storage systems over the network according to the protocol of the network. In addition, each host and storage system may include one or more ports for interfacing the host or storage system to a corresponding one or more networks. As described above, in one embodiment, each storage system in the network includes logic for filtering received requests to manage data accesses to the storage system.

Figure 1B:
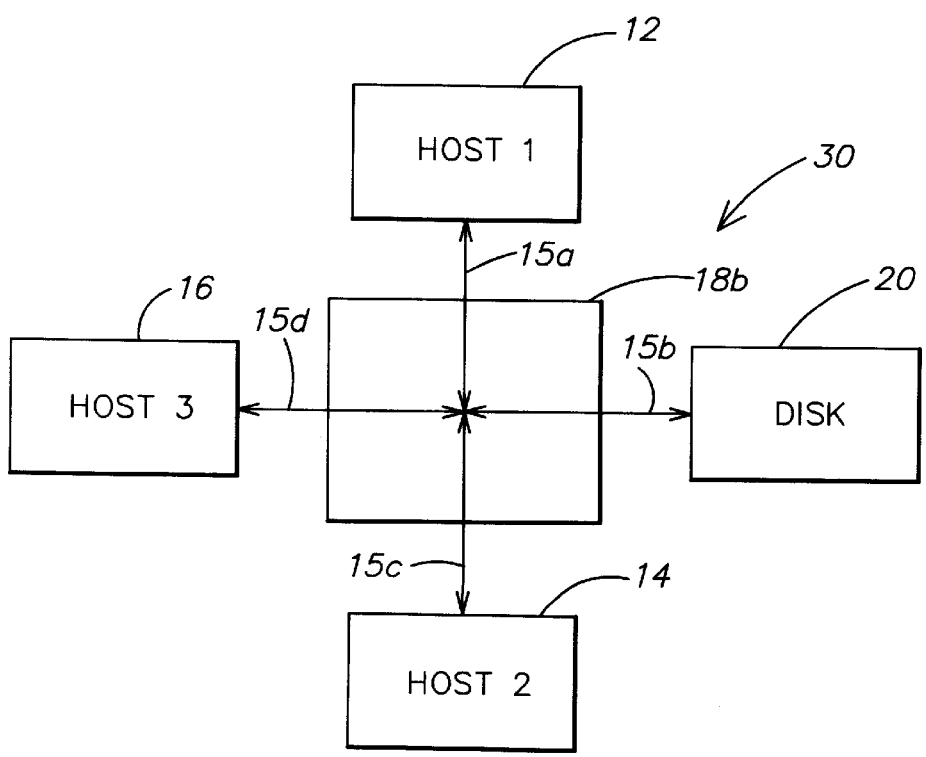
Figure 1C:
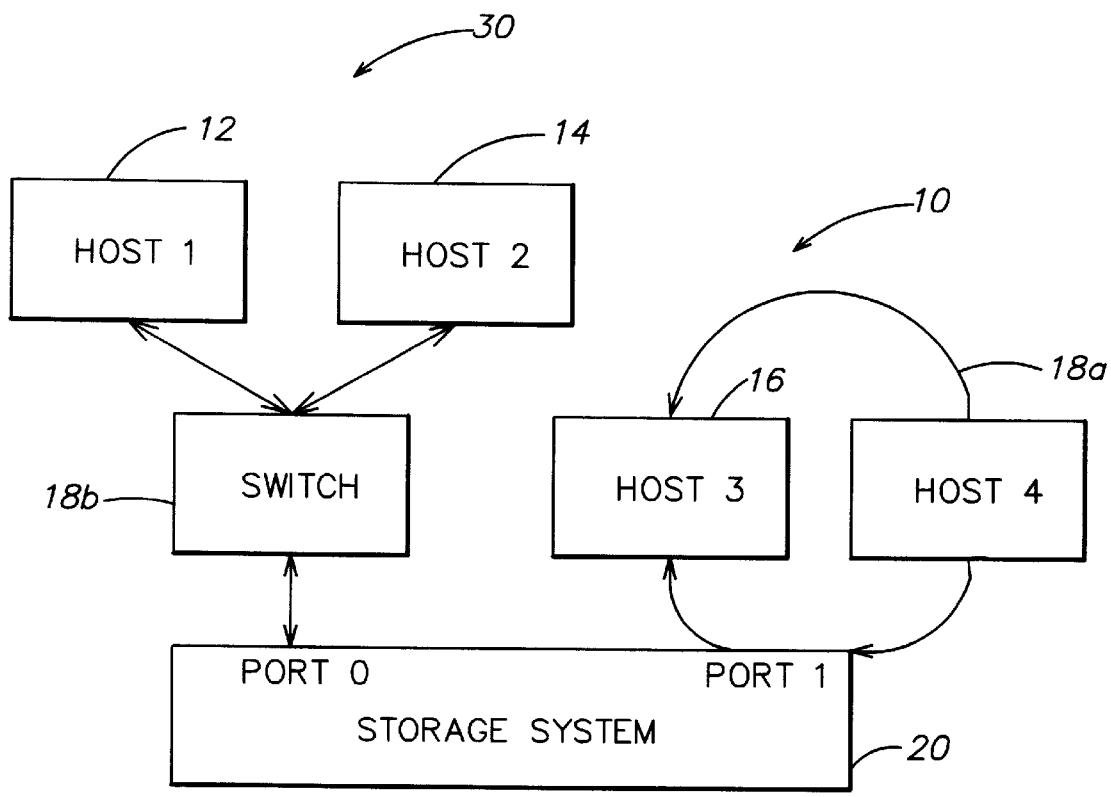

One exemplary network in which the present invention may be employed is a Fibre Channel network, although the present invention is not limited to the use of the Fibre Channel network or any other particular network configuration. Three example Fibre Channel network configurations are illustrated in FIGS. 1A, 1B, and 1C. FIG. 1A illustrates a network 10 arranged in a loop configuration, where all devices in the network are coupled together in a single loop. In FIG. 1A, three host processors 12, 14 and 16 are shown coupled to a storage system 20 by a hub 18a. Internally, the hub is arranged in a loop configuration. Communication between the devices, over the busses 15a–15d, is performed by passing data packets from one device to the next in the loop. FIG. 1B illustrates a network 30 arranged in a fabric configuration, where all the devices are coupled together by a hub 18b. Internally, the hub is arranged as a switch. Communication between pairs of the devices 12, 14, 16 and 20 in the network 30 is controlled by the hub 18b. The data management method of the present invention may be employed in networks arranged in the loop or fabric configurations illustrated in FIGS. 1A and 1B, or alternatively in other network or resource sharing configurations. For example, the data management aspect may be employed in the network illustrated in FIG. 1C. In FIG. 1C, a host/storage system configuration is shown where the storage system includes two ports, each of which interfaces the storage system to a different network. In FIG. 1C, a first port (Port 0) is coupled to a fabric network 30 and a second port (Port 1) is coupled, to a loop network 10.

As mentioned above, the data management aspect of the present invention configures volumes of data at the storage system 20 according to the identity of the host devices coupled to the storage system. The configuration data that is used to manage the allocation of volumes to different hosts may be provided, for example, by a system administrator of the network. The system administrator tracks the host devices that are coupled to the network and the available volumes at the storage system. As a new host device enters the network, the system administrator allocates storage system volumes to the host. The number of volumes allocated to the host may be based on a requested number of volumes, or alternatively may be based on historical data requirements of the host. The system administrator may be implemented in software, executing on one of the devices or storage systems in the network, and may include a graphical user interface to enable users to monitor the availability and assignment of volumes to different hosts in the network. The present invention is not limited to any particular implementation of the system administration.

Generally, as each device enters the network it queries the network to identify the other devices coupled to the network. Each device that responds to the query returns one or more identifiers for the device. For example, the identifier may include the world wide name (WWN) assigned to the device by the manufacturer of the adapter board using a naming convention. The identifier may also include a source identifier (ID). Both are unique identifiers for the device, however the source identifier is generally a shorter identifier than the WWN. The source identifier may identify the device (e.g., a host processor) and the port of the device that is coupled to the network. Thus, if multiple ports of the particular device are coupled to the network, an identifier may be returned for each port. When the query operation is complete, each of the devices has knowledge of the other devices coupled in the network. Once each device has knowledge of the other devices in the network, this information can be used to exchange data between devices.

Requests and responses to and from the storage system 20 are forwarded over the networks 10 and 30 according to the network protocol. The Fibre Channel interconnect is capable of carrying multiple interface command sets. Accordingly, the devices that are coupled together using the Fibre Channel network may communicate using any of a number of higher level protocols including Internet Protocol (IP), Small Component System Interconnect (SCSI) protocol or any of a number of other protocols provided that the interfacing devices have knowledge of the type of protocol that is being used on the particular Fibre Channel interconnect. Certain types of devices have historically been designed to communicate using certain protocols. For example, host processor devices have historically communicated with storage systems using the SCSI protocol. Thus, devices coupled using the Fibre Channel network may communicate with each other using the same protocols that have historically been used. As a result, existing interfaces of the devices require little re-design to couple to the Fibre Channel network.

Tunneling techniques typically are used to convert packets of any type of protocol into packets that may be propagated on the Fibre Channel network. Using tunneling, one packet, formatted according to a first protocol, is enveloped in a second packet formatted according to the Fibre Channel network protocol. Thus, a SCSI packet may be enveloped in a Fibre Channel packet by a host processor or storage system for transmission on a Fibre Channel network. One example of a packet formatted according to a SCSI protocol and enveloped in a Fibre Channel packet is illustrated in FIG. 2.

Figure 2:
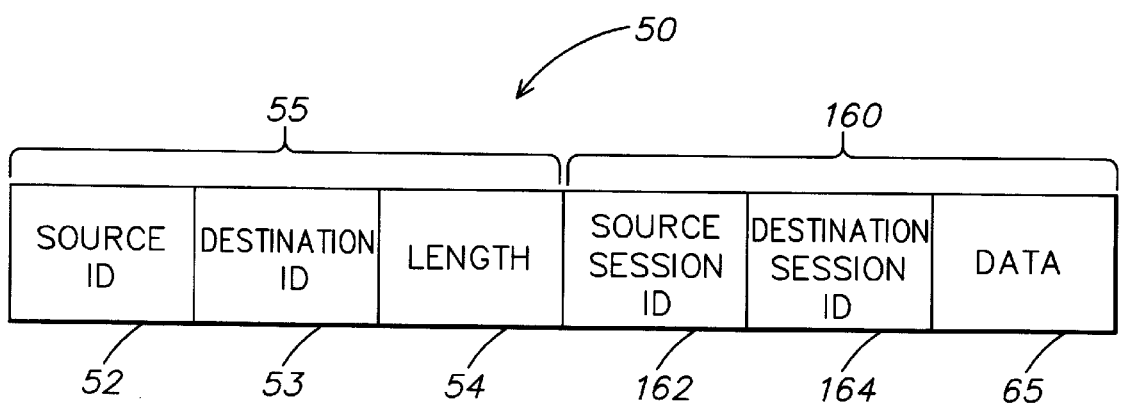
FIG. 2 illustrates one embodiment of a packet that can be distributed between devices coupled in the networks of FIGS. 1A, 1B or 1C.

In FIG. 2, a Fibre Channel packet 50 includes a header portion 55 and a payload portion 60. The header portion 55 includes a source ID field 52, a destination ID field 53 and a length field 54. The source ID field 52 identifies a device in the network that initiated the transmission of the packet 50. The destination ID field 53 identifies a target device for receiving the packet in the network. The length field 54 identifies a number of bytes in the packet. In addition, other fields defined in the Fibre Channel specification also may be included in the header, although these fields are omitted herein for clarity purposes.

The source ID field 52 and destination ID field 53 are used in the exemplary system of FIG. 1C to identify particular host processors and the storage system. When a host issues a request packet to the storage system, the source ID identifies the host and the destination ID identifies the storage system. In accordance with one embodiment of the invention, the storage system uses the source ID field 52 of the packet to index into configuration data identifying which of the volumes of data the respective host has privilege to access.

As mentioned above, the source ID field for a host accessing the storage system 20 can be used to identify the host that issued the request to index into configuration data for the host at the storage system. The configuration data identifies the portions of the storage system that are accessible by the host. Thus, the configuration data can be used by filter logic at the storage system to selectively service the host's request. Exemplary components of a host and storage system that may be used to implement the method and apparatus for filtering requests based on a host identifier will now be described with regard to FIGS. 3–5.

As described above, in one embodiment of the invention, the storage system determines whether a received request should be serviced based on the configuration data. A copy of the configuration data may be stored in a memory at the storage system. Periodically, the configuration data may be updated by the system administrator as hosts enter and exit the network. The storage system also includes logic for communicating over the network and filtering logic, coupled to the memory that stores the configuration data, for determining whether a request received from the network should be serviced. The above-described data management system may be implemented in a variety of ways and the present invention is not limited to any particular implementation. However, for purposes of clarity, one embodiment of a host processor and storage system capable of providing this data management functionality is illustrated in FIG. 3.

Figure 3:
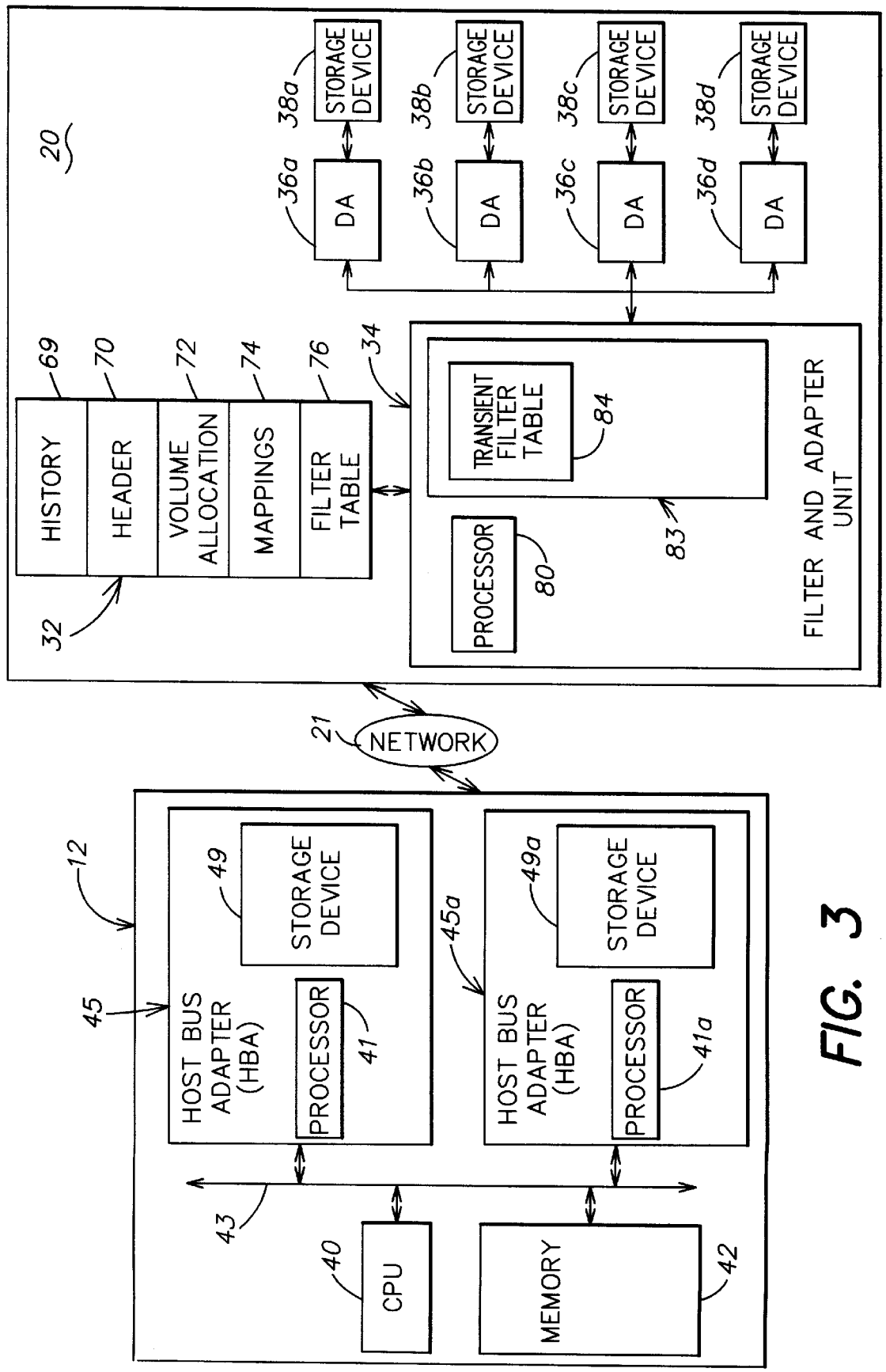
FIG. 3 is a block diagram illustrating exemplary components of a host processor and storage system which may be coupled in the networks of FIGS. 1A, 1B or 1C, the storage system including; an adapter having elements for filtering requests issued by the host processor according to one embodiment of the present invention.
Figure 4:
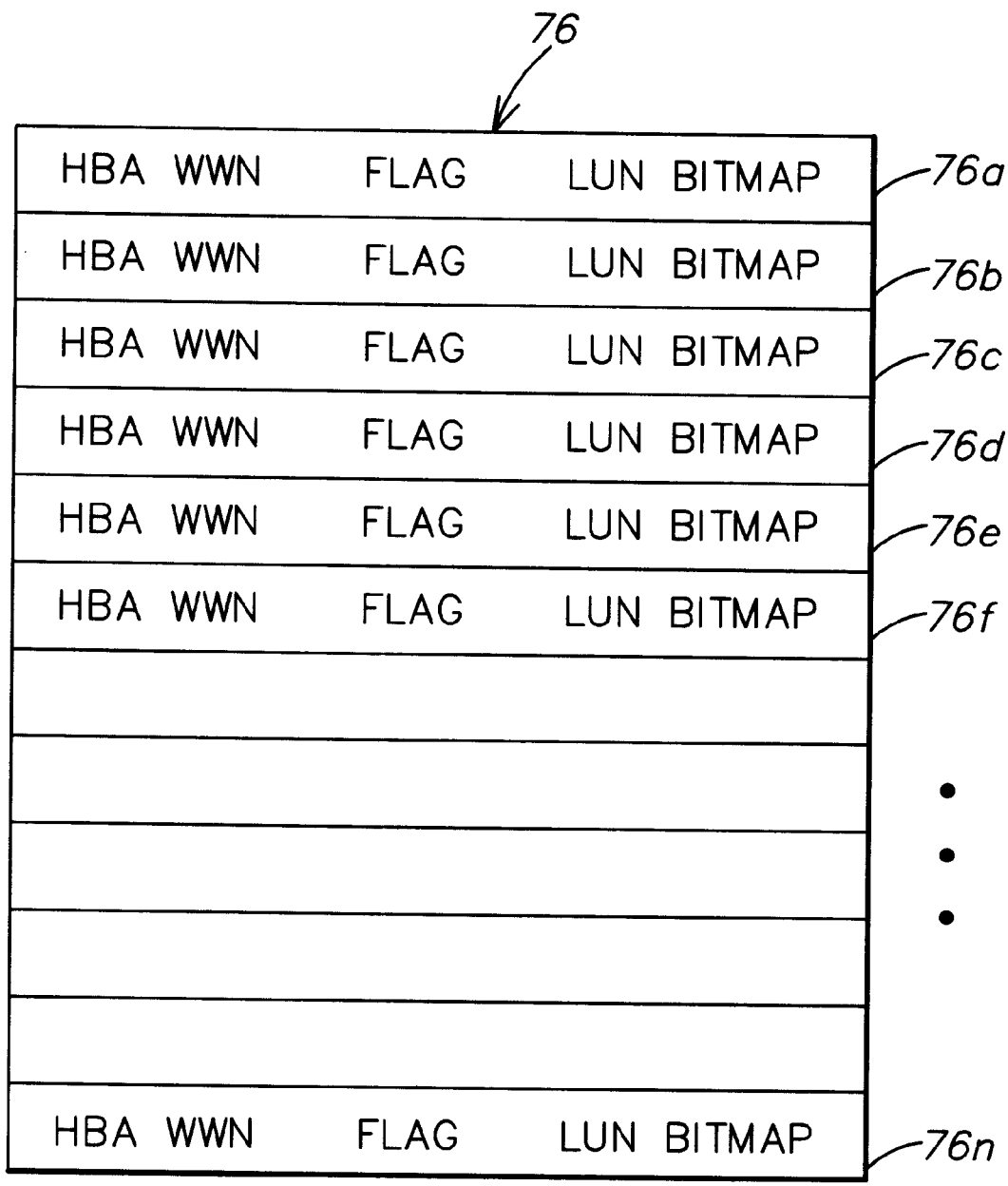
FIG. 4 is a block diagram of one embodiment of a configuration data structure that may be used to store filtering information for use by the storage system of FIG. 3.

FIG. 3 illustrates a host processor 12 coupled to a storage system 20 using a network 21. The network 21 may be, for example, a Fibre Channel network arranged in any of the configurations illustrated in FIGS. 1A–1C. The host processor 12 may be a multi-processing unit, including one or more central processing units such as CPU 40 coupled by a local bus 43 to a memory 42. One or more host bus adapters (HBAs) 45 and 45a are coupled between the bus 43 and the network 21.

Each host bus adapter (HBA) 45 and 45a operates to connect the host processor 12 to the network. The HBAs 45 and 45a translate data received from the CPU 40 into the format dictated by the protocol of the network. In addition, the HBAs 45 and 45a translate data received from the network in packet format into data in a format usable by the CPU 40.

The host bus adapter may be implemented using a combination of hardware resident on the HBA and driver software stored in the HBA or in the memory 42. Alternatively, the host bus adapter may be implemented either entirely in hardware or software. In one embodiment, the HBA 45 includes a processor 41 coupled to a storage system 49. The processor 41 controls the flow and format of data into and out of the HBA 45. The memory 49 is used to provide temporary storage of data as it is transferred to and from the network. The HBA generates packets for transmission over the network 21, with each packet including a source ID field identifying the particular HBA. Because multiple HBAs may be included at each host, multiple source IDs may be associated with the same host.

The storage system 20 includes storage devices 38a–38d which may include one or more disk devices. Access to the storage devices 38a–38d is controlled through the use of disk adapters 36a–36d which may be implemented using a programmed processor or custom hardware design. In the embodiment illustrated in FIG. 3, a disk adapter is provided for each storage device 38a–38d, although alternatively a disk adapter may be coupled to more than one storage device. In addition, disk adapters may include secondary connections to the storage devices 38a–38d of another disk adapter 36a–36d to permit recovery from failure of one disk adapter by shifting its functions to the. second disk adapter.

The storage devices 38a–38d are apportioned into volume sets. One or more of the volume sets may be made available to one or more of the HBAs 45, 45a or the host processor 12. In one embodiment, references to the volumes in the storage devices 38a–38d by the HBAs are performed using logical unit numbers (LUNs). There need not be a one-to-one correspondence between the logical unit numbers provided by hosts and the physical addresses of the disk devices.

A configuration database 32 (FIG. 3) stores information regarding which ones of the HBAs have access to which ones of the volumes. As discussed above, in one embodiment information in the configuration database is received from the system administrator and is periodically updated as the configuration of the network changes.

An example of the types of data that may be stored in the configuration database 32 include a history table 69. The history table is apportioned into one block for each of the ports of the storage system. Each block in the history table includes a list of those hosts that have queried the port as they entered the network. The identification information for each host may include the WWN name of the host, the source ID of the host, or other aliases of the host. This identification information may be used when the host logs into the storage system to match an identifier of the host with configuration data for the host.

The configuration database 32 may also include a header portion 70 for mapping the HBAs to the available ports at the storage system. A volume allocation portion 72 may be provided for allocating logical volumes of data at the storage system 20 to different HBAs. A mapping portion 74 is provided for mapping LUNs to physical addresses of the disks. In addition, a filter table 76 is provided for controlling which HBAs have access to which of the LUNs. The filter table 76 is generated using the volume allocation and mapping information and includes a record for each HBA coupled any of the ports of the storage system. An example implementation of the filter table 76 is; provided in FIG. 4. Each record 76a–76n includes the WWN associated with the HBA, a flag indicating whether the volumes allocated in this entry are shared, and a LUN map identifing which of the logical volumes the HBA may access. In one embodiment, the LUN map is in the form of a bitmask with one bit allocated to each LUN in the storage system. In one embodiment, a bit in the bitmask is set to indicate that the associated HBA indicated by the WWN has access to the corresponding LUN, although alternatively the bit may be cleared to indicate access. In addition, alternative embodiments wherein the available LUNs are indicated differently may also be used.

The storage system 20 (FIG. 3) also includes a filter and adapter unit 34. The filter and adapter unit 34 translates packets received from the network into data blocks and control for forwarding to the disk adapters 36a–36d. In addition, the filter and adapter unit 34 performs a filtering function to ensure that only those HBAs with privileges are able to access volumes. Thus, rather than trusting that the HBAs will only access those volumes which they have been assigned, the filter and adapter unit 34 controls accesses to the disks by filtering out non-privileged requests.

In one embodiment, the filter and adapter unit 34 includes a processor 80 coupled to a memory 83. The processor is used to control the transmission and translation of data between the storage system 20 and the network 21. The memory 83 is used to store a transient filter table 84. The transient filter table is apportioned into a number of tables, one for each port of the storage system. Each time that an HBA initiates a connection with the storage system 20 over one of its ports, filtering information is copied from the filter table 76 in the configuration database 32 to the appropriate entry in the transient filter table 84. The filtering information may include the source ID of the HBA logged into the port, a flag indicating whether the volumes associated with this entry are shared, and a LUN map for the HBA logged into the port, where the LUN map is copied from the filter table 76 in the configuration database.

In one embodiment, the configuration data in the transient filter table 84 is accessed for each request. The address of the request is provided in Bus/Target/LUN format, where the Bus portion indicates the Fibre Channel network address of the storage system 20, the Target portion indicates the storage system port address, and the LUN represents the volume address of the request. The address is compared with the entry in the transient filter table 84 which includes the LUN map aassociated with the HBA. If the bit in the LUN map associated with the addressed LUN indicates that the HBA has access to the LUN, the request is forwarded to the disk adapters 36a–36d for servicing. If not, the request is ignored.

The size of the transient filter table 84 is related to the number of ports provided at the storage system, the number of HBAs supported at each port and the number of LUNs in the storage system. An example configuration of the storage system 20 may include sixteen ports for accessing 4096 LUNs, with each port capable of supporting accesses by thirty two different HBAs. Thus, when the transient filter table 84 is large, if it was stored in a single large memory the access time for each I/O request may be long.

Figure 5:
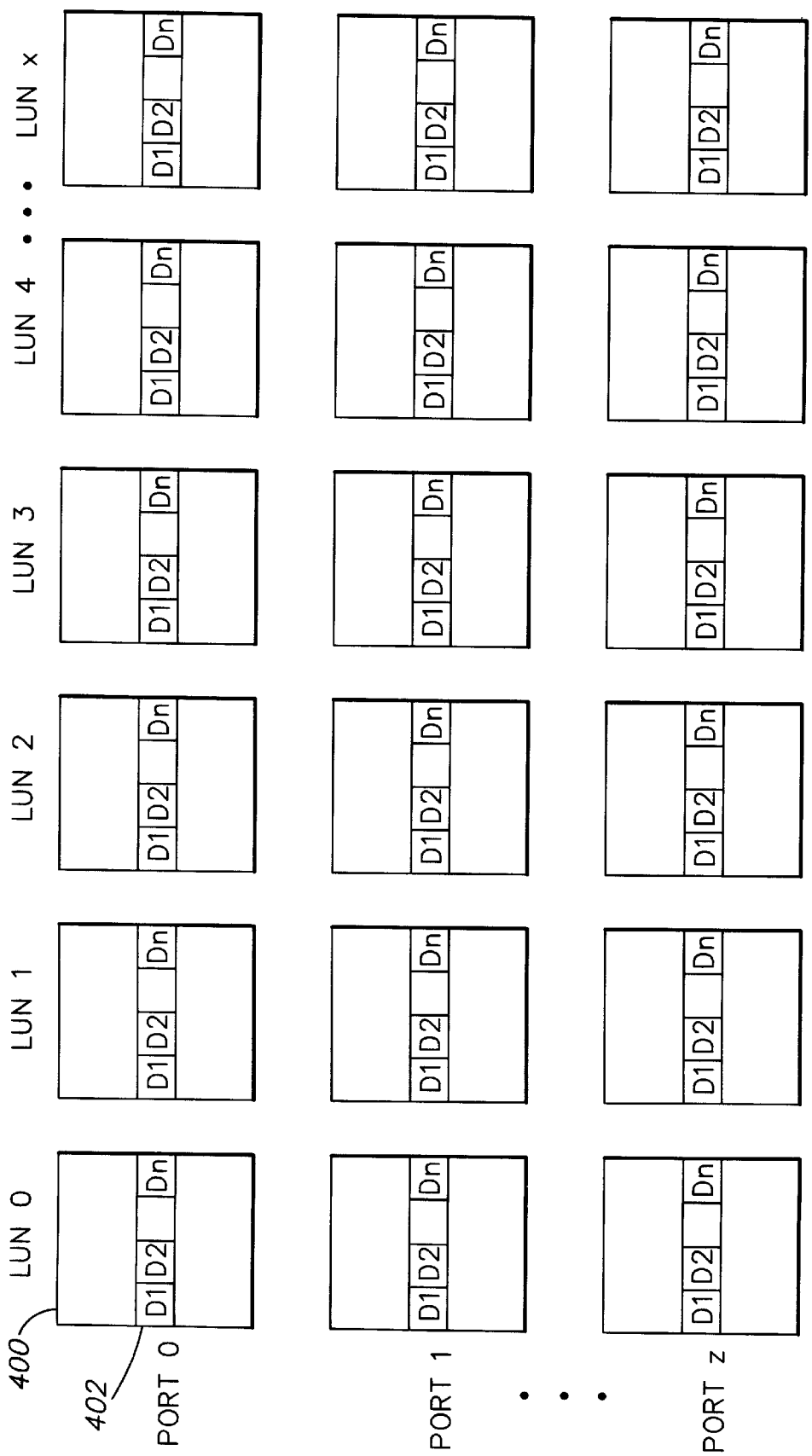
FIG. 5 is a block diagram of one embodiment of filtering data that may be used to filter requests at the storage system of FIG. 3.

In one embodiment, to increase the response time performance of the storage system 20, the transient filter table 84 is arranged to allow for quick retrieval of the access information for each HBA. Referring now to FIG. 5, one illustrative configuration of the transient filter table is shown. The transient filter table 84 is shown to include an array of records, such as record 400. One column of records is provided for each LUN in the storage system numbered in FIG. 5 as LUN0 to LUNx, where x+1 is the number of LUNs in the storage system. One row of records is provided for each port at the storage system. Each record includes a bitmap 402. The bitmap includes a number of bits corresponding to the maximum number of devices (HBAs) that can access each port. In FIG. 5, these bits are indicated as D1, D2 ... Dn, where n is the maximum number of devices that may be coupled to any port.

During operation, as an I/O request is received at the storage system 20, the address of the I/O request is compared with the data in the transient filter table 84. The address includes an identifier of the HBA which initiated the request, and an address to the storage system portion that the host wants to access. This address includes, generally, a Bus/Target/LUN combination of fields. The bus field is the base address of the storage system 20 on the network, the target is the source ID of the port of the storage system to which the request is directed, while the LUN indicates the logical unit addressed by the request. The target information (row) and LUN information (column) are used to index into the transient filter table to obtain one of the records. The source ID for the requesting device (e.g., HBA 45 in FIG. 3) is then used to select one of the bits in the bitmap 402 of the record 400 selected by the Bus/Target/LUN address to identify whether or not the bit is set in the mapping. If the bit is set in the mapping, then the request is forwarded to the disks for servicing. If not, the request is dropped.

The transient filter table 84 may be stored in memory, as illustrated in FIG. 3, or alternativeiy implemented in hardware. While the configuration of the transient database described above provides one method of accessing HBA and LUN mapping information, alternative configurations may also be used. The present invention is not limited to this implementation. Rather, any configuration database arrangement that allows mapping data to be obtained from the database using a source identifier and a resource address may be used.

Accordingly, a data management system that reserves volumes of data for host processors based on host identifiers has been described. In one embodiment, the data management system is, augmented to add security protection by authenticating each request to verify that it was truly sent by the host indicated by the host identifier received at the storage system 20. Authentication of the connections to the storage system 20 secures the data volumes allocated to each of the host processors by verifying that the host requesting a data volume is truly the host indicated in the source ID of the request packet. Simply relying on the source identifier of the host processor may not be a sufficient measure of protection. In some insecure environments, a processor may issue a false source identifier in an attempt to access privileged data of another host. Authentication thus verifies that the host processor is who it claims to be, and therefore should be allowed access to the data.

In one embodiment, to support the authentication of host requests, the storage system issues a number of unique, expected identifiers to each HBA of each host device prior to the initiation of transactions by the host device. The storage system maintains a copy of the expected identifiers. When the HBA associated with the host device initiates a series of transactions, it forwards the expected identifiers that were received from the storage system back to the storage system. The storage system compares each received identifier against the expected identifier. Because the storage system only forwarded the identifiers to the particular HBA associated with the host, if the correct identifier is received the storage system can verify that, in fact, the request was issued from the indicated host. In one embodiment, the level of security protection is further enhanced by using a random number for each identifier. In another embodiment, an encryption key, known only to the host and the storage system, is used to encrypt the identifier before it is sent to the storage system. The storage system may then decrypt the identifier using the encryption key. Encrypting the identifier prevents other devices that are coupled to the network from obtaining the identifier and gaining access to privileged data. Thus, a two-tiered level of authentication is provided, since each transaction has a unique identifier, known only to the issuing host, and the identifier is encrypted using a unique access key known only to the HBA at that host.

In one embodiment, the identifier information is transferred between the devices on the network (e.g., the host and the storage system 20) using selected fields of the packet. Referring again to the example packet of FIG. 2, illustrated in the payload portion 160 of the packet 50 are some of the fields that are used to communicate according to the SCSI protocol. These fields include a source session ID 162, a destination session ID 164 and a data field 65. According to the SCSI protocol, the source session ID and destination session ID are used to track an order of transactions between an initiating device and a target. The SCSI protocol allows a number of transactions to be simultaneously outstanding between an initiating device and a target device. For example, a host initiator may issue a number of I/O requests to different volumes in a target storage system. Depending upon the accessibility of each of the volumes, the order in which the responses to the requests are returned to the host may differ from the order of the issued requests. The session IDs are used to align requests with responses at the host. The session IDs provided for each transaction may be arbitrary numbers as long as they are unique across a given time period. Because the session ID may be any arbitrary number, in one embodiment the session ID fields are used to transfer unique identifier information for each transaction.

Figure 6:
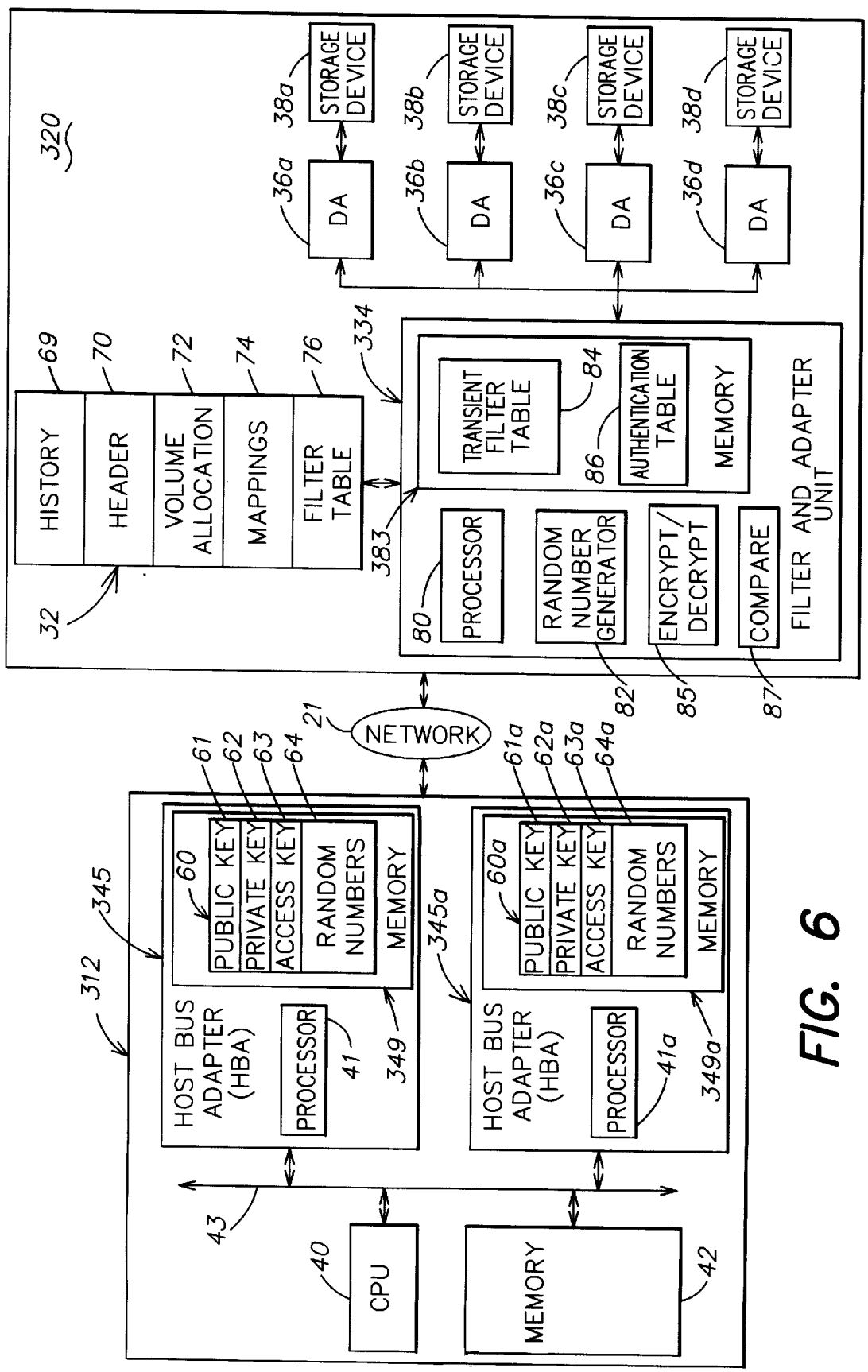
FIG. 6 is a block diagram illustrating exemplary components of a host processor and storage system that may be coupled in the network of FIGS. 1A, 1B or 1C, the storage system including logic for authenticating transactions by the host according to one embodiment of the present invention.

The above-described authentication method may be implemented in a variety of ways and the present invention is not limited to any particular implementation. However, for purposes of illustration, an embodiment of a host processor 312 and storage system 320 including components for providing the above-described authentication functionality is shown in FIG. 6. In FIG. 6, the host bus adapter 345 stores in its memory 349 a data structure 60. The data structure 60 includes, for each storage system 320 coupled to the HBA, a public key 61, a private key 62, an access key 63, and a list 64 of one or more random numbers. Each of the keys is a field of bits which may be used to encrypt and decrypt data using techniques known to those of skill in the art. Encryption and decryption are performed by applying the bit values of the keys to bit values of data using logical operations associated with a selected encryption algorithm. The access key is a key that is dedicated to encrypting and decrypting authentication data transferred between the HBA and the associated storage system. In one embodiment, an initial value for the access key 64 is obtained using the public and private keys 62 and 63, respectively, as will be described in more detail below.

To support authentication, the storage system 320 includes a filter and adapter unit 334 that may include each of the features described with regard to FIG. 3, as well as a number of other components to support authentication. The filter and adapter unit 334 includes a random number generator 82 which is used to provide random numbers used in the authentication process for each of the HBAs coupled to the storage system. Coupled to the random number generator 82 is an encrypter/decrypter 85 and a comparator 87. The transient filter table 84, authentication table 86, random number generator 82, encrypter/decrypter 85 and comparator 87 are used in conjunction to authenticate connections to the storage system 20 using a method that will be described in more detail below.

Figure 7:
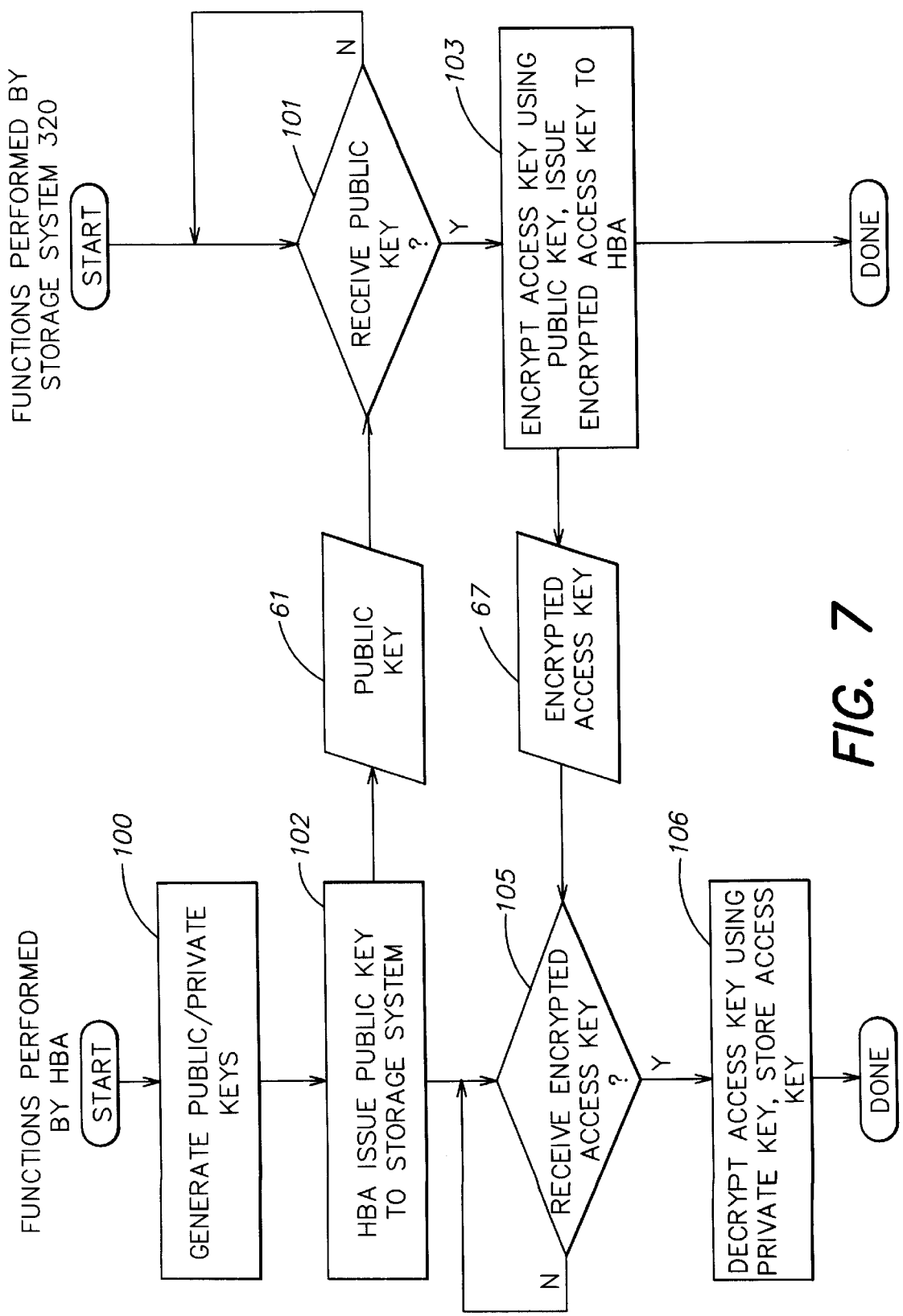
FIG. 7 is a flow diagram illustrating one method of distributing encryption keys between a host processor and storage system of FIG. 6, so that the encryption keys can be used to authenticate the identity of the host processor.

As described above, the authentication method involves the transfer of identifiers between the host 312 and the storage system 320 over the network 21. In one embodiment, the identifiers are encrypted using an access key stored at the host 312 and at the storage system 320, although this is not a requirement of the invention. FIG. 7 illustrates one method of distributing an access key to the host 312 and the storage system 320.

Access keys may be provided in a number of ways, including allocating access keys to the storage system and host processors in advance of their entry to the network. Alternatively, an access key may be obtained after the host processor has entered the network in a manner described with regard to the data flow diagram of FIG. 7. In FIG. 7, operations performed by the HBA 345 (FIG. 6) are illustrated on the left hand side of the figure, operations performed by the storage system 320 are illustrated on the right hand side of the figure, and data flows are illustrated between the two sides. At step 100, the HBA 345 (FIG. 6) generates a public and private key pair. This can be done, for example, using known encryption software executing on the CPU 40. The public and private key pair is dedicated to the HBA and is not accessible by any other device coupled to the network 21 (FIG. 6). Data which is encrypted by the public key 61 can only be decrypted using the private key 62, while data that is encrypted by the private key 62 can only be decrypted using the public key 61.

At step 102, the HBA 345 forwards the public key 61 over to the storage system 320. In sitep 101, the storage system 320 loops, waiting for the key. When the storage system 320 receives the public key at step 101, it proceeds to step 103. In step 103, using the public key 61, the storage system 320 encrypts an access key for the HBA 345, forwards this encrypted access key 67 back to the HBA 345 over the network 21 (FIG. 6) and terminates. Because the HBA 345 is the only device in the network that has the private key 62 that must be used to decrypt any message encrypted with the public key, other devices that are monitoring the transactions on the network will not be able to decipher the encrypted access key 67 forwarded by the storage system 320. When it is determined at step 105 that the HBA 345 has received the encrypted access key 67, the process running on the HBA 345 proceeds to step 106, wherein the HBA 345 decodes the encrypted access key using the private key 62. In addition, at step 106, the HBA 345 stores the access key in data structure 60 with the public key 61 and private key 62 for later communications with the storage system 320.

Once the host processor has received the access key, it may begin the process of issuing I/O requests to the storage system 320. The processes by which a host processor issues an I/O request, and by which an I/O request is serviced by the storage system 320 in accordance with one embodiment of the invention will now be described with regard to the flow diagrams of FIGS. 8a–b and FIG. 9.

Figure 8A:
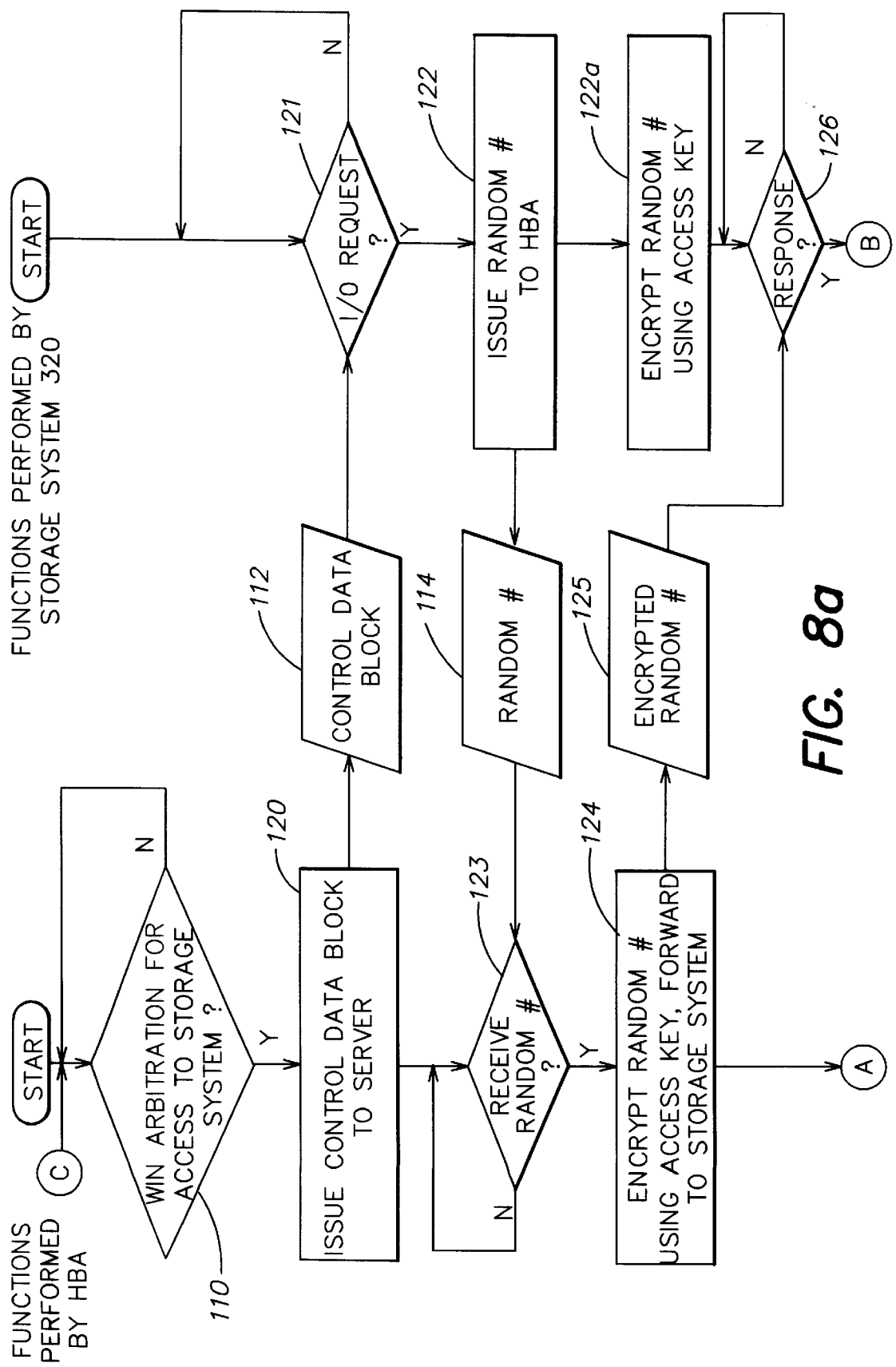
FIGS. 8a–c are is a flow diagram illustrating one method of authenticating the identity of a host processor when establishing a connection between the host processor and storage system of FIG. 6 in accordance with one embodiment of the invention.

In FIG. 8a, a flow diagram is provided for illustrating one embodiment of a method that may be performed to establish a connection between the HBA 345 and the storage system 320. In FIG. 8a, operations performed by the HBA 345 are indicated on the left hand side of the figure, operations performed by the storage system 320 are indicated on the right hand side of the figure, and data flows are shown in between. At step 110, the HBA 345 arbitrates for access to the storage system 320. At step 120, when the HBA 345 has won arbitration, it issues a control data block 112 to the storage system 320. The control data block 112 includes the source ID of the HBA 345 and indicates that the HBA requests to be serviced by the storage system 320. When it is determined at step 121 at the storage system 320 that there is an outstanding request from the HBA, the method proceeds to step 122 wherein in response to the host's request, the storage system 320 forwards a unique identifier 114 to the HBA 345. In one embodiment, the identifier is a random number provided in the destination session ID 64 of the payload portion 60 of the packet 50 as illustrated in FIG. 2. At step 122a, after the storage system has forwarded the random number to the HBA, the storage system 320 encrypts the random number 114 using the access key and stores the encrypted random number for later comparison.

When it is determined at step 123 that the HBA has received the random number from the storage system 320, at step 124 the HBA encrypts the random number 114 using the access key 63 (obtained using the process of FIG. 7), and returns the random number to the storage system 320 as an encrypted number 125. When it is determined at step 126 that the storage system 320 has received a response, at step 127 the storage system 320 compares the received random number 125 against the previously encrypted and locally stored version of the random number generated at step 122. The compare status 128 is forwarded to the HBA. If there is not a match, this indicates to the storage system that the host does not have the correct access key, and/or that the host does not know the correct random number and the connection between the host processor and the storage system is not authenticated. The HBA is not permitted to access data at the storage system 320, and the transaction is complete. If there is a match, then the host has the correct access key, and the correct random number and connection between the HBA and the storage system is authenticated.

Once the connection between the HBA and the storage system has been authenticated, the HBA may send an I/O request to the storage system 320 for servicing. In one embodiment of the invention, every I/O transaction is authenticated using a different identifier (e.g. random number). Because the SCSI protocol allows for multiple I/O requests from an HBA to be outstanding at any given time, the HBA keeps track of the outstanding I/O requests using a technique referred to as command tag queuing. Each I/O request is assigned a unique tag, using the source session ID field 62 (FIG. 2). When a response is returned from the storage system, the tag is included in the session ID field of the response so that the response data may be aligned with the request using the tag.

The maximum number of I/O requests that an HBA may have outstanding at any instant in time is determined according to the command tag queuing protocol. Because each I/O request is assigned a unique identifier, each HBA should always include a sufficient number of identifiers to ensure that an identifier can be provided for each outstanding request. Therefore, according to one embodiment, as each device logs into the storage system a list of unique identifiers is forwarded to the device. The number of identifiers in the list corresponds to the maximum number of I/O requests capable of being outstanding at the device, although the present invention is not limited to this number. As each device issues a request to the storage system, one of the identifiers is used from the list. Each time that the storage system responds to a request, it returns a new identifier which is stored at the bottom of the list. Identifiers are selected in first in first out order from the list. As a result, a constant number of identifiers is maintained at the device to satisfy command tag queuing protocols.

One embodiment of a method of providing the identifiers to the host is described below. Because a unique identifier or random number will be associated with each I/O request, at the start of an I/O sequence, the HBA requests a number of random numbers equal to the maximum number of permissible outstanding I/O requests. The list of random numbers is stored as list 64 in data structure 60 (FIG. 6) of the HBA 345 and is additionally stored in the authentication table 86 of the filter and adapter unit 334 (FIG. 6) of the storage system 320.

Figure 8B:
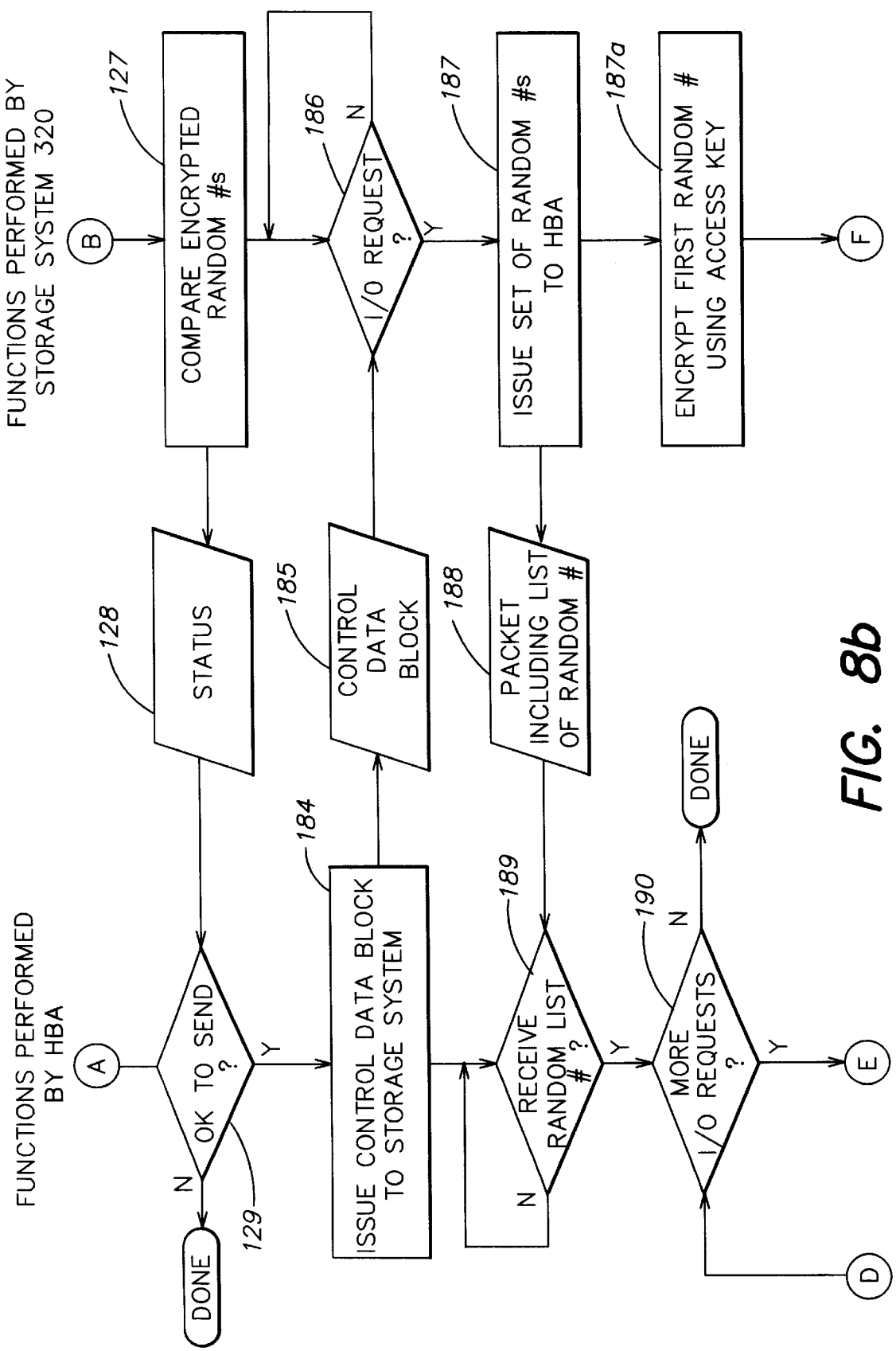
Figure 8C:
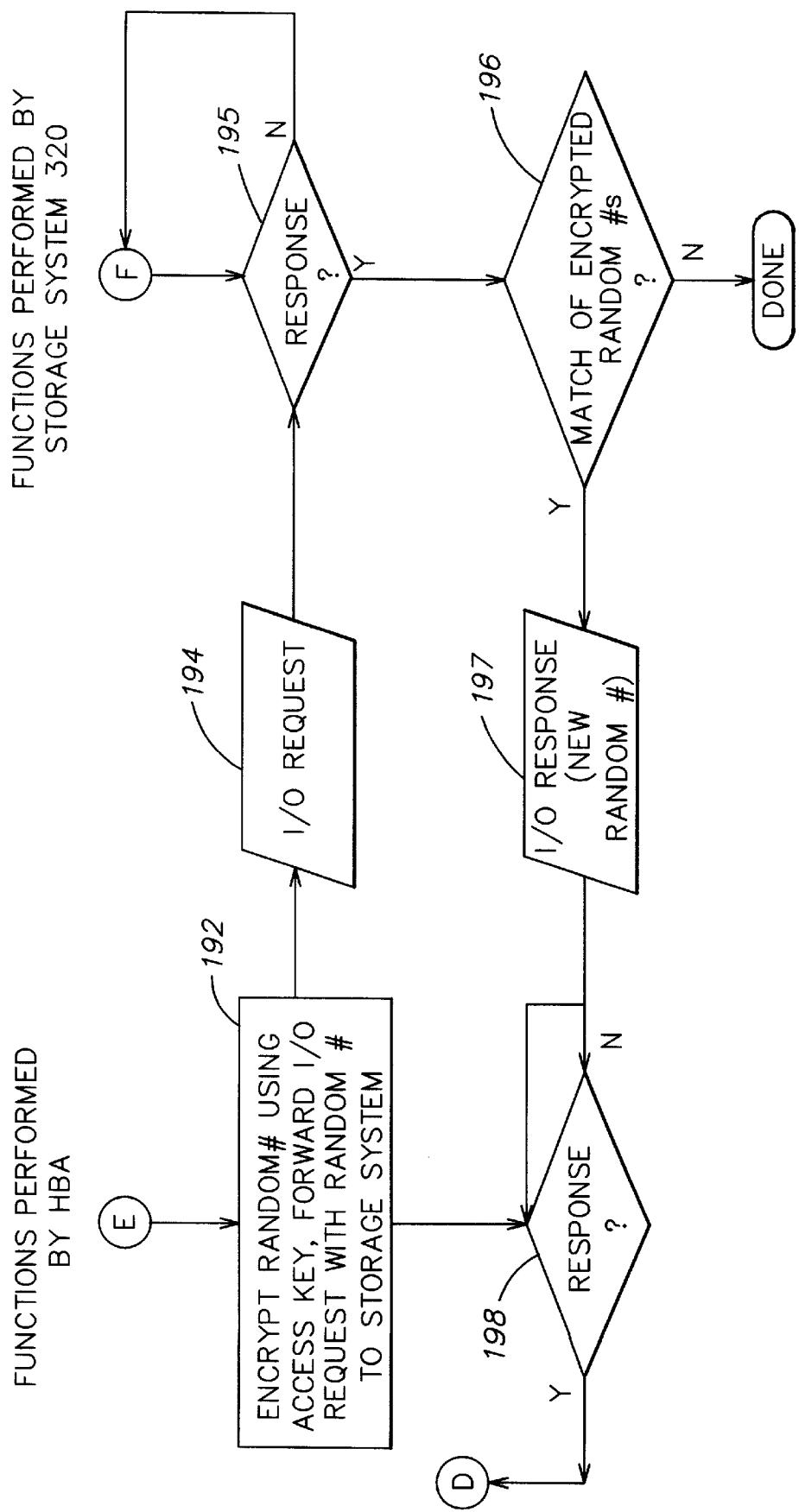
Figure 9:
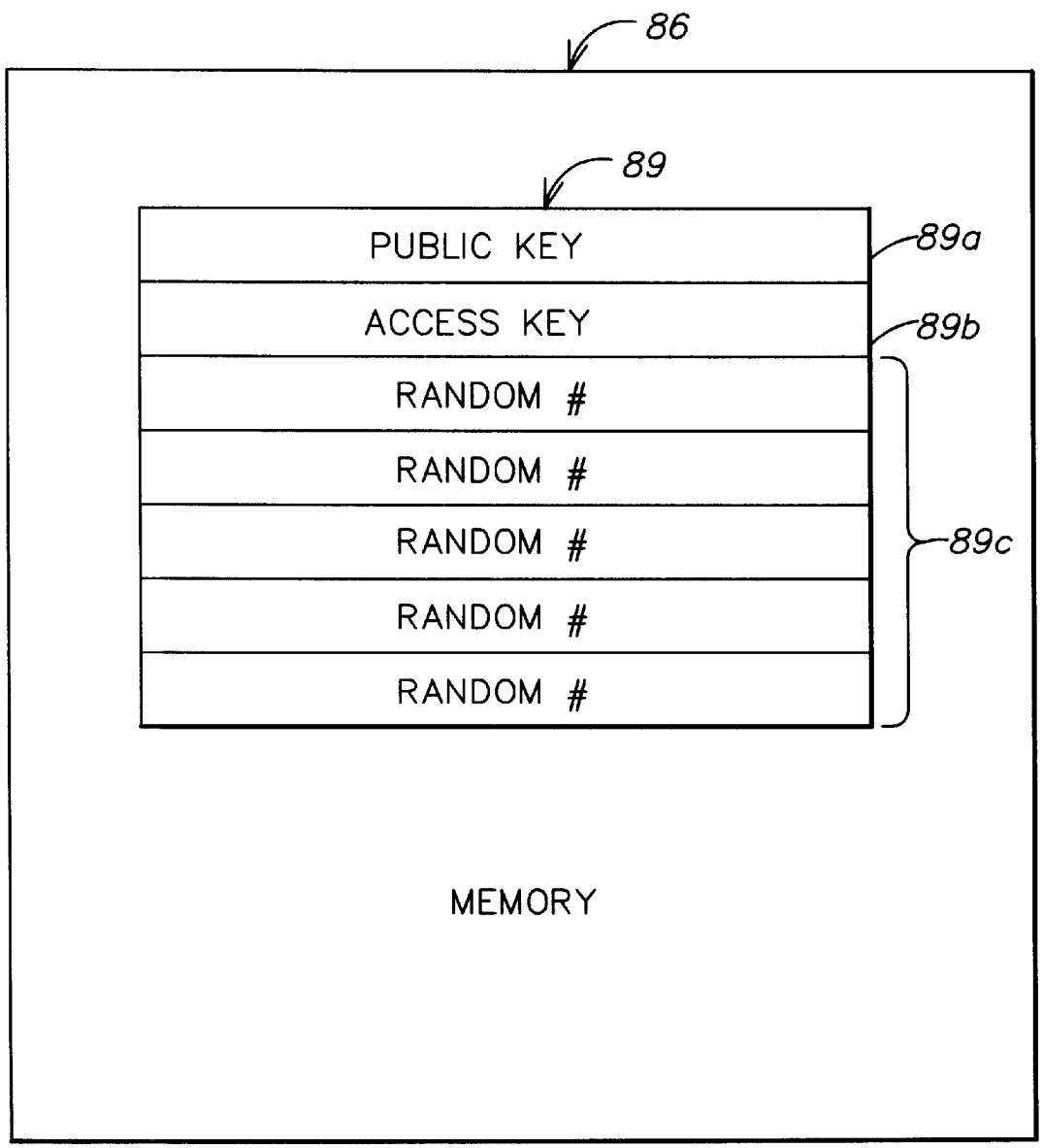
FIG. 9 is a diagram illustrating exemplary components that may be included in an authentication table of the storage system of FIG. 6 and that may be used to authenticate the identity of host processors according to one embodiment of the invention.

Referring now briefly to FIG. 9, an example of elements that may be stored in the authentication table 86 (FIG. 6) is shown. For each of the HBAs that is coupled to the storage system 320, a data structure 89 is provided. The data structure may include a public key 89a, which is a copy of the public key 61 that was provided by the HBA to obtain the initial access key 63. In addition, the data structure 89 may include an access key 89b, which is a copy of the access key 63 stored at HBA 345. In one embodiment, each of the data structures further includes a list of random numbers. The random number in each entry of the data structure 89c corresponds to a random number that will be used to authenticate an associated transaction. How the random number is used to authenticate a transaction is described in more detail with regard to FIG. 8b.

In FIG. 8b, at step 184, the HBA issues a control data block 185 to the storage system 320. The control data block 185 includes control for notifying the storage system 320 that the HBA is going to initiate an I/O transaction, and that the connection has been authenticated. When it is determined at step 186 that a request has been received, the storage system 320 decodes the request. and at step 187 forwards a packet 188 including a list of random numbers to the HBA 345. At step 187a, the storage system 320 also encrypts the first random number using the access key and stores. the encrypted number locally for later comparison with the encrypted number received in a request from the HBA.

When it is determined at step 189 that the HBA has received the packet 188, at step 190 the HBA 345 checks to determine whether there is an outstanding I/O request. If so, at step 192, the HBA 345 encrypts the first random number using the access key, stored in field 63 of the data structure 60. The HBA 345 then inserts the encrypted random number in the source session ID field of the I/O request packet, and forwards the I/O request packet 194 to the storage system 320.

When it is determined at step 195 at the storage system 320 that an I/O request packet has been received, at step 196 the storage system 320 compares the encrypted random number received in the source session ID field of the I/O request packet 194 against the encrypted random number generated at step 187. Alternatively, the storage system 20 may simply decrypt the received random number and compare it against the expected random number. If there is a match, the storage system 320 services the I/O request, and forwards a response packet 197 back to the HBA 345. The response packet includes any data requested by the HBA, and a new random number which will be used once the numbers in the list 188 are exhausted. In one embodiment, the new random number is provided in the destination session ID field, while the previous, encrypted random number is returned in the source ID field for tracking purposes, although the use of specific fields is not a limitation of the present invention.

When it has been determined at step 198 that a response has been received from the storage system 320, the HBA retrieves the non-encrypted random number from the session ID fields of the packet 197 and stores the random number in the data structure 60. The process then proceeds to step 190, where the HBA initiates the next I/O request, using the next random number from the random number list 64 encrypted using the access key.

Thus, a method is provided wherein unique identifiers are used to authenticate a host at a storage system. Although the method has been described using random numbers, it should be understood that this is not a requirement of the invention, and that any sequence of numbers that does not include a readily discernable pattern may alternatively be used. As discussed above, more than one HBA may be simultaneously connected to the storage system 320. Thus, as identifiers are distributed to coupled HBAs, their sequence will similarly be distributed among the variety of HBAs that are coupled to the storage system 320, thereby making the number distribution appear even more random and accordingly more secure. In addition, although encryption techniques have been described, it is not a requirement of the invention that identifiers be encrypted prior to transfer. Alternatively, an authentication technique may be used which does not include identifiers for each request but encrypts the entire request using the access key. It is also envisioned that a different access key may be provided for each transaction. The present invention may incorporate any combination of these authentication techniques and is therefore not limited to the specific embodiments discussed above.

The above techniques may be used to verify that a connection between an initiator and a target is authorized. In another embodiment, techniques are also used to ensure that the data that is received at the target is the data that was sent by the initiator. Accordingly, further security may be obtained by applying validation methods to ensure that commands and data are not corrupted during a transfer from the initiator to the target. The validation method may be provided to preclude other devices that are coupled to the network from interfering with transactions between the initiator and the target.

According to another aspect of the invention, a method for validating a data transfer between a source and a target over the network includes the step of maintaining, at both the target and the initiator, a digital signature of the transfer. The digital signature is in the form of a checksum. Each byte of data that is transferred between a target and an initiator is combined with the previous bytes of the transfer using a hashing function to form the checksum. The hashing function may be, for example, an exclusive OR function, or some derivative thereof. The data included in the signature may include only that data forwarded by the initiator to the target, only that data forwarded from the target to the initiator, or a combination thereof.

Figure 10:
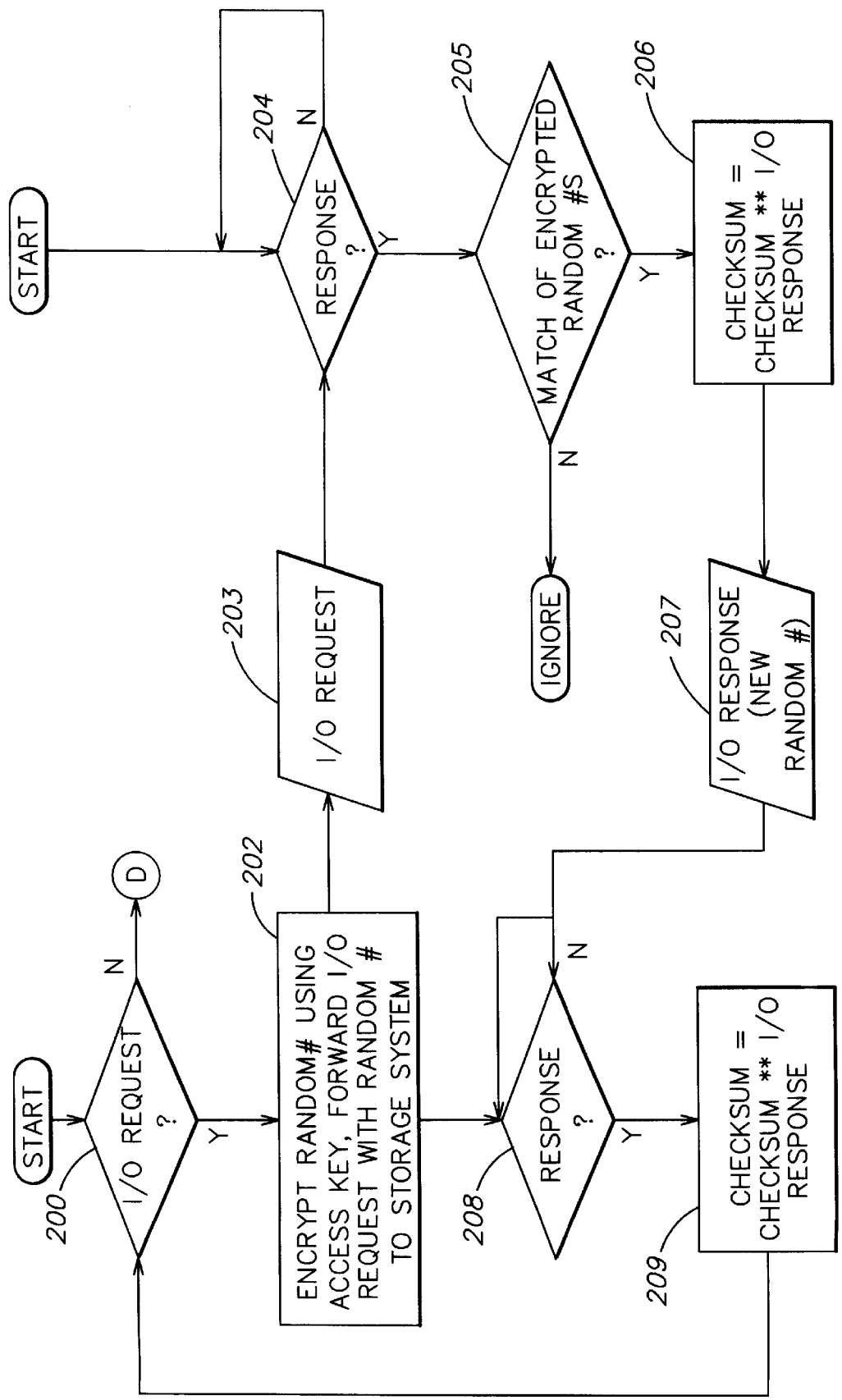
FIG. 10 is a flow diagram illustrating one method of performing a checksum of data transferred between an initiator and target in the networks of FIGS. 1A, 1B and 1C for validating data transfers in one embodiment of the invention.
Figure 11:
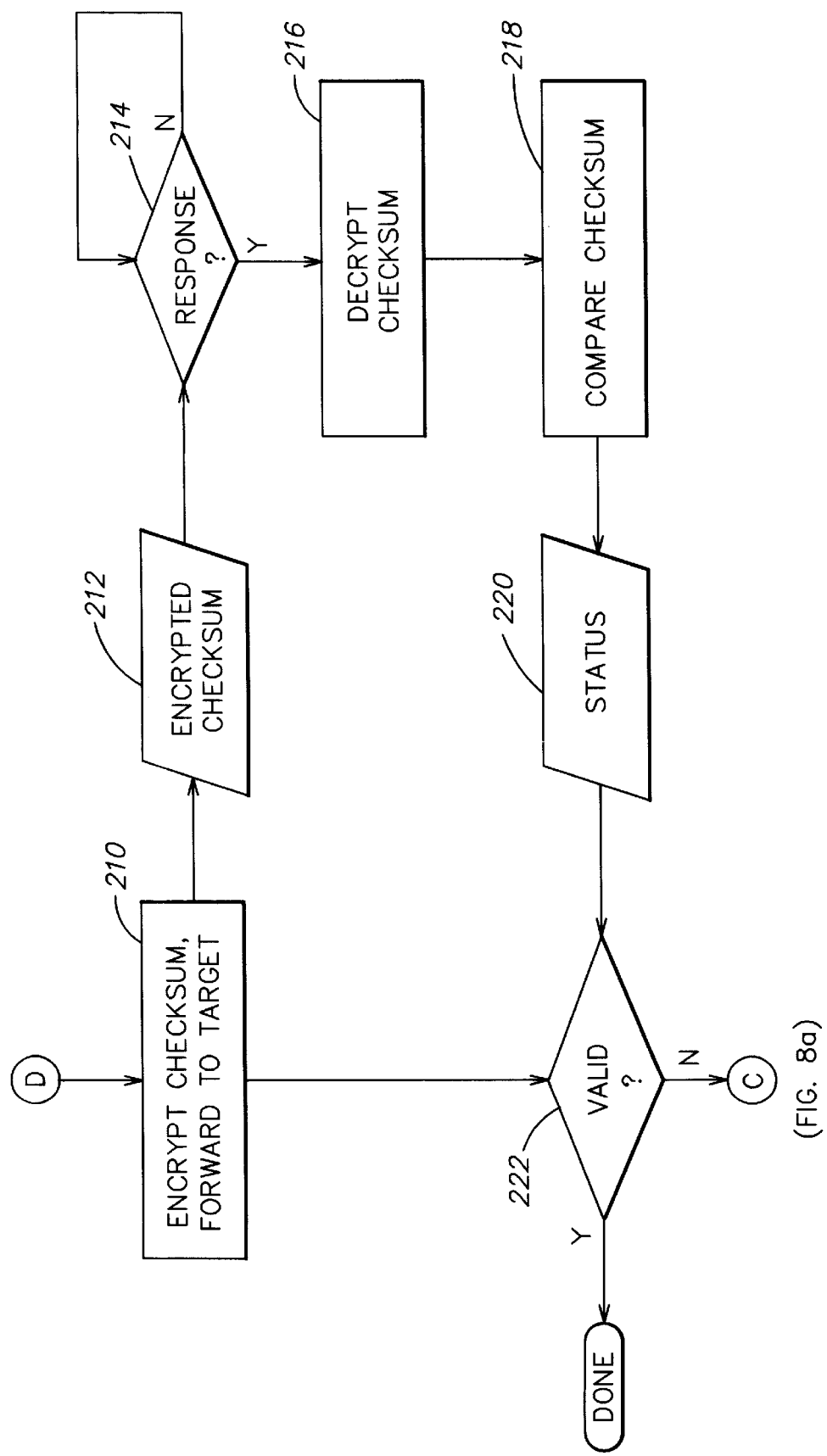
FIG. 11 is a flow diagram illustrating one method of validating a data transfer between an initiator and target using the checksum of FIG. 10 according to one embodiment of the invention.

Referring now to FIG. 10, a flow diagram of one embodiment of a method for validating a data transfer between an initiator and a target is shown. The flow diagram is similar to that described with regard to FIG. 8b, but includes steps for validating the data transfer. At step 200, it is determined at the initiator whether or not there are any I/O requests. If so, at step 202, the initiator encrypts the random number associated with the transaction and forwards the I/O request 203, with the encrypted random number in the source session ID, to the target. When it is determined at step 204 that the target received the request, at step 205 the target compares the received encrypted number against a stored encrypted expected random to determine a match. If there is no match, the target does not respond. If there is a match, at step 206 the target forwards a new encrypted random number and response data to the target. Also, at step 206, the target hashes the response data into the existing checksum to provide a new checksum to build the digital signature of the data transfer. The response 207 is received at the initiator in step 208. At step 209, the initiator also hashes the response data into the existing checksum to provide a new checksum to build the digital signature of the data transfer. The process of issuing I/O requests and generating checksums continues for the number of requests in the initiator/target connection. When it is determined at step 200 that there are no more requests, the process proceeds to the validation phase in step 210, illustrated in FIG. 11.

At step 210, the initiator encrypts the checksum using the access key, and forwards the encrypted checksum 212 to the target. The target receives the encrypted checksum, at step 214. At step 216, the target decrypts the checksum and at step 218 the target compares the decrypted checksum with the checksum generated by the target. The target sends a status packet 220 to the initiator indicating whether or not the checksums matched. If it is determined at step 222 at the transaction was valid (i.e, no data was corrupted), then the connection between the initiator and the target is completed. If the status 220 indicates that the transaction was not valid and that data was corrupted, then the initiator re-establishes the connection with the target and repeats the data transaction.

Thus, a data management method and apparatus has been described that provides three levels of data management.

Filtering is provided to ensure that each host only accesses volumes of data for which it has privileges. Security may be incorporated using authentication methods to verify that each request was truly issued by the host indicated in the identifier of the request. Finally, validation may be provided to ensure that data is not corrupted during transit. A system using the data management method and apparatus of the present invention may incorporate one or more of these levels of data management independently, and thus the present invention is not limited to a system including all the recited data management techniques described above. Such a data management system provides increased control over data accesses by users at a host processor by limiting the data capable of being accessed by the host processor. Thus, while users at a host processor may be capable of accessing all of the data allocated to the host processor (depending upon the privileges associated with the user), neither the users or even the system administrator with the highest privilege at the host processor is capable of accessing data that is not allocated to the host by the storage system, regardless of the privileges of the user on the host.

Although the above discussion relates to an exemplary system wherein a host gains access to data at a storage system, the above described methods may be applied to any system wherein a resource is shared by multiple devices. Such systems include, but are not limited to any type of storage system including disk devices, tape devices, file servers and the like.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A data management method for managing access to a storage system by a device, the method comprising steps of:

transmitting from the storage system, to the at least one of the plurality of devices, at least one expected identifier to be included in at least one subsequent request issued by the at least one of the plurality of devices to the storage system to indicate that the at least one request has been issued by the at least one of the plurality of devices; and receiving at the storage system, from the at least one of the plurality of devices, at least one request including the at least one expected identifier indicating that the at least one request has been issued by the at least one of the plurality of devices.

2. The method according to claim 1, wherein the step of authenticating further comprises steps of:

assigning, at the storage system, an expected identifier for each one of the series of requests expected to be initiated by the device;

prior to initiation of each of the series of requests by the device, forwarding the expected identifier associated with each request from the storage system to the device; and for each request received at the storage system, comparing an identifier received with the request to the expected identifier associated with the request to authenticate the request.

3. The method according to claim 2, wherein the step of selectively servicing each request includes a step of forwarding a new expected identifier to the device for a subsequent request.

4. The method according to claim 2, wherein the storage system and the device each stores an encryption access key, and wherein the step of authentication further comprises a step of:

comparing an encrypted identifier received at the storage system with an expected identifier at the storage system to verify that the device that issued the request has the access key and the identifier.

5. The method according claim 4, wherein the encrypted identifier is encrypted by the device using the encryption access key prior to receipt of the encrypted identifier by the storage system, and wherein the step of authenticating further includes the step of encrypting the expected identifier at the storage device using the encryption access key prior to comparing the encrypted identifier with the expected identifier.

6. The method according to claim 4, wherein the encrypted identifier is encrypted by the device using the encryption access key prior to receipt of the encrypted identifier by the storage system, and wherein the step of authenticating further includes the step of decrypting the expected identifier at the storage device using the encryption access key prior to comparing the encrypted identifier with the expected identifier.

7. The method according to claim 3, wherein the device and the storage system communicate according to the Small Component System Interconnect (SCSI) protocol, and wherein the step of selectively servicing the request includes a step of forwarding the new expected identifier in a session identifier field of a packet in the SCSI protocol.

8. The method according to claim 2, wherein the storage system is apportioned into a plurality of volumes, and wherein a plurality of devices are coupled to the storage system by an interconnect, and wherein the method further comprises a step of:

storing, in a configuration database, configuration information for each one of the plurality of devices that has access to the storage system, the configuration data indicating which of the plurality of devices is authorized to access which ones of a plurality of the volumes of data at the storage system.

9. The method according to claim 8, further comprising a step of storing in a table, for each one of the plurality of devices, a list of the expected identifiers assigned to the associated one of the plurality of devices.

10. The method according to claim 2, wherein the method further comprises a step of generating a random number to provide at least one of the expected identifiers.

11. The method according to claim 2, wherein a plurality of devices are coupled to the storage system by an interconnect, and wherein the method further comprises the steps of:

generating a sequence of random numbers; and distributing random numbers from the sequence of random numbers among the plurality of devices.

12. The method according to claim 2, wherein a series of one or more transactions is exchanged by the device and the storage system, and wherein the method further comprises a step of validating each of the series of transactions to ensure that the contents of each of the transactions are not altered during transit.

13. The method according to claim 12, wherein each transaction comprises a request issued from the device to the storage system and a response issued from the storage system to the device, and wherein the step of validating further comprises steps of:

maintaining, at the storage system, a first checksum of data forwarded to the device when servicing the series of transactions;

receiving, at the storage system, a second checksum from the device, the second checksum reflecting the data received by the device during the series of transactions; and comparing the first checksum and the second checksum to validate the series of transactions.

14. The method according to claim 12, wherein the step of validating further comprises steps of:

maintaining, at the storage system, a first checksum of data received from the device when servicing each transaction in the series of transactions;

receiving, at the storage system, a second checksum from the device, the second checksum reflecting the data forwarded by the device during the series of transactions; and comparing the first checksum and the second checksum to validate the series of transactions.

15. The method according to claim 12, wherein the step of validating further comprises steps of:

maintaining, at the device, a first checksum of data forwarded to the storage system when forwarding a series of transactions;

receiving, at the device, a second checksum from the storage system, the second checksum reflecting the data received by the storage system during the series of transactions; and comparing the first checksum and the second checksum to validate the series of transactions.

16. The method according to claim 10, wherein the step of validating further comprises steps of:

maintaining, at the device, a first checksum of data received from the storage system in the series of transactions;

receiving, by the device, a second checksum from the storage system, the second checksum reflecting the data forwarded by the storage system during the series of transactions; and comparing the first checksum and the second checksum to validate the series of transactions.

17. A method for managing access by at least one of a plurality of devices to a storage system coupled to the at least one of a plurality of devices by a network, the storage system including a plurality of storage devices, the method comprising steps of:

receiving, from the storage system, at the at least one of the plurality of devices, at least one expected identifier to be included in at least one subsequent request issued by the at least one of the plurality of devices to the storage system to indicate that the at least one of the plurality of devices issued the request; and issuing, from the at least one of the plurality of devices, at least one request to the storage system, the at least one request including the at least one expected identifier indicating that the at least one request has been issued by the at least one of the plurality of devices.

18. The method according to claim 17, wherein the step of issuing further comprises a step of:

issuing, from the device, a series of requests to the storage system, wherein each request in the series of requests includes a different expected identifier.

19. The method according to claim 17, further comprising a step of encrypting the expected identifier to provide an encrypted expected identifier, and wherein the step of issuing the request includes a step of forwarding the encrypted expected identifier to the storage system.

20. The method according to claim 17, wherein the device and the storage system are coupled by a network, and wherein the method further includes a step of issuing the request from the device to the storage system over the network.

21. The method according to claim 20, wherein the step of issuing the request further includes a step of issuing the request from the device to the storage system according to a Fibre Channel protocol.

22. The method according to claim 17, wherein the storage system comprises a plurality of disk devices apportioned into a plurality of volumes, and wherein the step of issuing includes a step of issuing the at least one request to be directed to one of the plurality of volumes in the plurality of disk devices to the storage system.

23. The method according to claim 17, wherein the device is a host processor coupled to the storage system over a network, and wherein the step of issuing the at least one request includes a step of forwarding the request from the host processor to the storage system over the network according to a Fibre Channel protocol.

24. The method according to claim 17, wherein the device is a file server coupled to the storage system over a network, and wherein the step of issuing the at least one request includes the step of forwarding the request from the file server to the storage system over the network according to a Fibre Channel protocol.

25. A host computer for use in a computer system including a storage system having a plurality of storage devices, and a network that couples the host computer to the storage system, the host computer comprising:

a port to receive from the storage system at least one expected identifier to be included in at least one subsequent request to the storage system; and a controller to issue at least one request for access to the storage system, the at least one request including the at least one expected identifier to indicate that the request is being issued by the host computer.

26. The host computer according to claim 17, wherein the controller issues a series of requests to the storage system, each request in the series of requests including a different expected identifier.

27. The host computer system according to claim 25, further comprising an encrypter to encrypt the expected identifier included in the at least one request.

28. The host computer system according to claim 25, in combination with the storage system and a network that couples the host computer to the storage system.

29. The combination according to claim 28, wherein the network operates according to a Fibre Channel network protocol.

30. The combination according to claim 28, in combination with at least one additional host, wherein the at least one additional host includes:

a port to receive at least one additional expected identifier to be included in at least one subsequent request from the at least one additional host to the storage system; and a controller to issue at least one request from the at least one additional host to the storage system, the at least one request including the additional expected identifier.

31. The combination according to claim 30, wherein the controller of the at least one host and the controller of the at least one additional host both issue requests according to a Fibre Channel network protocol.

32. The combination according to claim 28, wherein the storage system comprises a plurality of disk devices.

33. The combination according to claim 28, wherein the host computer is a file server.

34. A storage system comprising:
   at least one storage device; and
   an adapter to interface the storage system with a plurality of devices coupled to the storage system, the adapter to transmit to the at least one of the plurality of devices at least one expected identifier, and to receive the at least one expected identifier included in at least one subsequent request from the at least one of the plurality of devices to indicate that the at least one of the plurality of devices has issued the request, so that the adapter authenticates the at least one request from the at least one of the plurality of devices to verify that the at least one request was issued from the at least one of the plurality of devices; and
   wherein the adapter is arranged to selectively forward the at least one request to the at least one storage device for servicing responsive to authentication of the at least one request.

35. The storage system according to claim 34, wherein the adapter operates to forward the at least one request to the at least one storage device responsive to authenticating that a device indicated as having issued the at least one request is the device that actually initiated the request.

36. The storage system according to claim 34, wherein the adapter operates to prevent the at least one request from being forwarded to the at least one storage device responsive to determining that a device indicated as having issued the at least one request is not the device that actually initiated the request.

37. The storage system according to claim 34, wherein the adapter further includes an authentication table to store authentication information for each of the plurality of devices.

38. The storage system according to claim 37, wherein the authentication table comprises, for at least one of the plurality of devices, a list including at least one expected identifier, with the at least one expected identifier being associated with at least one request to be received from the at least one device.

39. The storage system according to claim 37, further comprising:
   a random number generator, coupled to the authentication table, the random number generator generating expected identifiers for inclusion in the list.

40. The storage system according to claim 37, further comprising:
   an encrypter, coupled to the authentication table, to encrypt the expected identifiers in the list.

41. The storage system according to claim 37, further comprising:
   a comparator to compare at least one authentication identifier received from the at least one device against the at least one expected identifier in the list.

42. The storage system according to claim 34, further comprising:
   a digital signature unit, coupled to the adapter, to maintain a checksum of responses forwarded from the storage system to one of the plurality of devices.

43. The storage system according to claim 42, wherein the adapter further comprises:
   means for comparing a checksum received from one of the plurality of devices against the checksum maintained at the digital signature unit for the one of the plurality of devices to determine the validity of data received from the one of the plurality of devices.

44. The storage system according to claim 34, in combination with the plurality of devices and a network that couples the storage system to the plurality of devices.

45. The combination according to claim 44, wherein the network operates according to a Fibre Channel protocol.

46. The storage system according to claim 34, wherein the at least one storage device includes at least one disk drive.

47. The combination of claim 44, wherein one of the plurality of devices is a host processor.

48. The combination of claim 44 wherein one of the plurality of devices is a file server.

49. An adapter for use in a device to authenticate a connection between the device and a storage system, the adapter comprising:
   a data structure comprising at least one entry to store at least one unique identifier provided by the storage system; and
   a controller to issue at least one request to the storage system, wherein the request includes the at least one unique identifier, thereby indicating that the at least one request is being issued from the device, so that the storage system can use the at least one unique identifier to authenticate the connection between the device and the storage system.

50. The adapter according to claim 49, wherein the controller issues a series of requests to the storage system, and wherein each request in the series of requests includes a different one of the at least one unique identifiers.

51. The adapter according to claim 49, further comprising:
   an encrypter to encrypt the at least one unique identifier prior to forwarding the at least one identifier with the at least one request.

52. The adapter according to claim 49, wherein the at least one request comprises a packet of data comprising a plurality of fields, wherein the packets are formatted according to the Small Component System Interconnect (SCSI) protocol, wherein one of the plurality of fields of the packet is a session identifier field, and wherein the controller includes the at least one unique identifier in the session identifier field of the at least one request.

53. The adapter according to claim 52, further means for extracting a new unique identifier from a packet received from the storage system, and means for storing the new unique identifier in the data structure.

54. The adapter according to claim 49, further comprising:
   a digital signature unit to maintain a checksum of data received from the storage system in response to the at least one request to validate that the data was not altered during transit.

55. The adapter according to claim 54, further comprising:
   means for forwarding the checksum to the storage system;
   means for receiving status information from the storage system indicative of whether the checksum forwarded by the adapter matched a checksum generated at the storage system; and means, responsive to the status information, for re-issuing the at least one request by the adapter.

56. The adapter according to claim 49, in combination with the storage system and a network that couples the adapter to the storage system.

57. The combination according to claim 56, wherein the network is a Fibre Channel network.

58. The combination according to claim 56, wherein the storage system includes at least one disk drive.

59. The adapter according to claim 49, in combination with a host processor and a network, wherein the adapter couples the host processor to the network.

60. The adapter according to claim 49, in combination with a file server and a network, wherein the adapter couples the file server to the network.

* * * * *